United States Patent [19]

Satoh

[11] Patent Number: 5,742,400
[45] Date of Patent: Apr. 21, 1998

[54] IMAGE PROCESSING APPARATUS

[75] Inventor: Keiji Satoh, Kawasaki, Japan

[73] Assignee: Fujitsu Limited, Kanagawa, Japan

[21] Appl. No.: 632,154

[22] Filed: Apr. 15, 1996

[30] Foreign Application Priority Data

Jul. 12, 1995 [JP] Japan ................................ 7-175880

[51] Int. Cl.$^6$ ................. G06T 5/00; H04N 1/21; H04N 1/409
[52] U.S. Cl. ................. 358/262; 358/404; 395/877
[58] Field of Search .................. 382/262, 260, 382/264, 254, 275, 261; 358/463, 447, 404; 395/877

[56] References Cited

U.S. PATENT DOCUMENTS 4,270,183  5/1981  Robinson et al. ................ 395/877
5,173,951  12/1992  McMahon ........................ 382/264

FOREIGN PATENT DOCUMENTS 5-12437  1/1993  Japan.

Primary Examiner—Scott A. Rogers
Attorney, Agent, or Firm—Armstrong, Westerman, Hattori, McLeland & Naughton

[57] ABSTRACT

An image processing apparatus can improve positional accuracy by effecting median filtering processing while ensuring real-time operations by reducing the amount of data processing by software. In this image processing apparatus, when a counter has counted up to a predetermined number, or when the counter's value is increased by a predetermined number after the counter has counted up to the predetermined number, a filter circuit control section activates a filter circuit. As a result, the filter circuit performs median filter processing for multi-gradation image data stored in an FIFO storage section. The image processing apparatus is suitable for use in measuring the position, shape, size, etc. of an object from multi-gradation image data obtained as a result of photographing the object with a camera or the like.

5 Claims, 8 Drawing Sheets

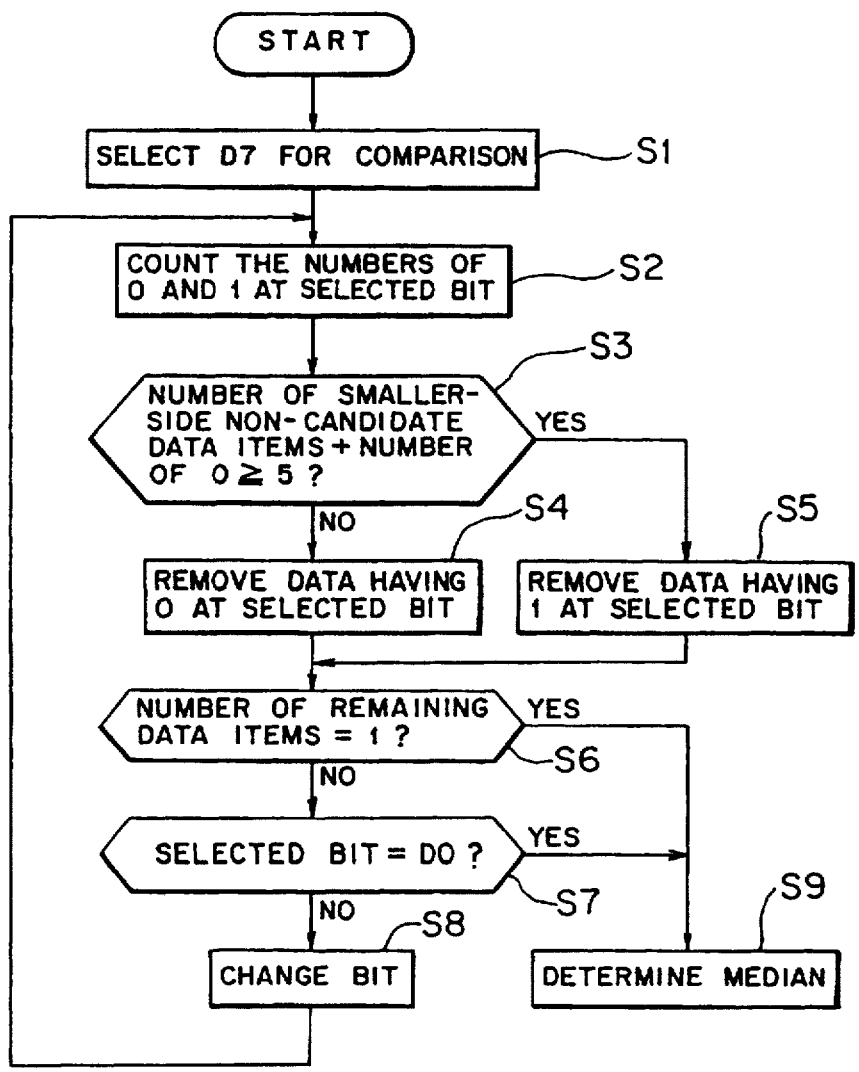

| DATA No. | D7 | D6 | D5 | ~ | D0 |
|---|---|---|---|---|---|
| (1) | 1 | 1 | · | ~ | · |
| (2) | 1 | 1 | · | ~ | · |
| (3) | 0 | 1 | · | ~ | · |
| (4) | 1 | 1 | · | ~ | · |
| (5) | 0 | 1 | · | ~ | · |
| (6) | 1 | 1 | · | ~ | · |
| (7) | 0 | 0 | · | ~ | · |
| (8) | 0 | 1 | · | ~ | · |
| (9) | 1 | 0 | · | ~ | · |

⇒

| DATA No. | D7 | D6 |
|---|---|---|
| (1) | 1 | 1 |
| (2) | 1 | 1 |
| (3) | 0 | 1 |
| (4) | 1 | 1 |
| (5) | 0 | 1 |
| (6) | 1 | 1 |
| (7) | 0 | 0 |
| (8) | 0 | 1 |
| (9) | 1 | 0 |

⇒

| DATA No. | D7 | D6 |
|---|---|---|
| (1) | 1 | 1 |
| (2) | 1 | 1 |
| | | |
| (4) | 1 | 1 |
| | | |
| (6) | 1 | 1 |
| | | |
| | | |
| (9) | 1 | 0 |

| 0 | 1 | 4 | 5 |
|---|---|---|---|
| 2 | 3 | 6 | 7 |
| 40 | 41 | 44 | 45 |
| 42 | 43 | 46 | 47 |

FIG. 16

| Pattern | 0 | 1 | 2 | 3 | 4 | 5 | 6 | 7 |
|---|---|---|---|---|---|---|---|---|
| Number of pixels | 0 | 1 | 1 | 2 | 1 | 2 | 2 | 3 |

| Pattern | 8 | 9 | 10 | 11 | 12 | 13 | 14 | 15 |
|---|---|---|---|---|---|---|---|---|
| Number of pixels | 1 | 2 | 2 | 3 | 2 | 3 | 3 | 4 |

FIG. 17

| Pattern | 0 | 1 | 2 | 3 | 4 | 5 | 6 | 7 |
|---|---|---|---|---|---|---|---|---|
| | 0, 0 | x, y | x, y+1 | 2x, 2y+1 | x+1, y | 2x+1, 2y | 2x+1, 2y+1 | 3x+1, 3y+1 |

| Pattern | 8 | 9 | 10 | 11 | 12 | 13 | 14 | 15 |
|---|---|---|---|---|---|---|---|---|
| | x+1, y+1 | 2x+1, 2y+1 | 2x+1, 2y+1 | 3x+1, 2y+1 | 2x+2, 2y+1 | 3x+2, 3y+2 | 3x+2, 3y+2 | 4x+2, 4y+2 |

IMAGE PROCESSING APPARATUS

BACKGROUND OF THE INVENTION

1) Field of the Invention

The present invention relates to an image processing apparatus suitable for use in measuring the position, shape, and size of an object on the basis of multi-gradation image data which have been obtained as a result of photographing the object with a camera or the like.

2) Description of the Related Art

In recent years, in the field of robot control, miniaturization of a camera and a higher processing speed of a microprocessor have made it possible to measure the position of a robot by processing an image of the robot captured by a camera and to subsequently feedback control the position (posture) of the robot.

Image data involves a massive amount of information, which in turn requires a very large memory. Further, positional measurement requires a vast number of calculations although each calculation is simple. These requirements still pose significant problems for a built-in computer. Particularly, in the case of a unit designed for use in a special environment, for example, for use in an artificial satellite, there is a strong demand for simplified software processing and simplified hardware because of the demand of reducing the weight and power consumption.

In general, when image data obtained by photographing with a camera are coded into binary digits, the value of the multi-gradation image data are compared with a threshold value, and the data are coded into binary digits, that is, ON/OFF values, pixel by pixel. In some cases, the image data are filtered so as to remove noise components from the data before the data are coded into binary digits.

Two methods are used to filter out noise. One filtering method is called a low-pass filtering method. According to this method, captured multi-gradation image data are sequentially read by software, and data relating to an area measuring n by n pixels (n is an odd number), with a target pixel being located at the center of the area, are weighted and averaged. According to another method called a median filter method, a median is obtained by sorting data relating to an area measuring n by n pixels which are obtained in a similar manner.

When image data are coded into binary digits, software or hardware compares the value of each pixel with a threshold value so as to carry out ON/OFF judgment.

When the image is measured on the basis of binary coded data, the same identification number is assigned to each pixel in a group of consecutive pixels of the binary coded image. After assignment of the identification number to the pixels has been completed, the identification number is read pixel by pixel. Then, the size, shape, and position of an area comprising pixels each having the same identification number are measured.

At this time, any one of the following techniques may be employed. Specifically, a first technique involves ensuring a sufficient memory bit width for assigning an identification number to each pixel, and a second technique involves deleting an image area which is deemed to be obviously unnecessary after identification numbers have been completely used. A third technique involves stopping the assignment of identification numbers to pixels after identification numbers have been completely used and starting again from the beginning the processing of an image while changing photographing parameters, such as brightness.

(a) Problems related to filtering

Either a low-pass filter or a median filter is used in filtering noise components from an image. When these two filters are compared with each other, the low-pass filter filters noise by blurring an image. The image filtered by the low-pass filter is inferior in positional accuracy to the image filtered by the median filter. The median filter that involves sorting requires a large amount of data processing. Therefore, it is difficult to ensure real time operations in a system, such as a built-in computer, which uses a CPU having a lower processing speed. For this reason, the realization of a median filter which involves a reduced amount of data processing by software to be performed.

(b) Problems associated with coding of image data into binary digits and assigning of identification numbers to pixels Image data are coded into binary digits pixel by pixel, and identification number are assigned to the respective binary digits. In such a case, for example, given that storage capacity per pixel is one byte, only a number up to 255 can be given. There is no alternative but to increase the bit width of each pixel, or to execute extra processing in order to delete unwanted image areas when the identification number exceeds 255. For these reasons, it is desired that the bit width of the identification number be increased without increasing memory capacity.

(c) Problems associated with measurement

The measurement of an image requires the reading of information relating to each pixel in order to calculate the center of gravity of the image based on the size and shape of the area occupied by pixels having the same identification number. In the case of a two-dimensionally distributed image, the information must be read a very large number of times. To reduce the throughput of software, it is desirable to reduce to as small a number as possible the number of times the information is read and the number of times it is calculated. Particularly, since the image memory has a large capacity, it takes much longer time to access the image memory than it does to access the program memory. Therefore, the number of access to the image memory greatly affects the overall performance of the apparatus.

SUMMARY OF THE INVENTION

The present invention is conceived to solve the above mentioned problems, and a first object of the present invention is to improve positional accuracy of an image by implementing a median filter while reducing the amount of data processing by software and ensuring real-time operations. A second object of the present invention is to make it possible to reduce the capacity of image memory required for processing a binary coded image and to ensure real-time operations by speeding up control processing based on a result of the measurement of the image in a system having a limited amount of hardware and limited CPU performance.

To these ends, according to a first aspect of the present invention, there is provided an image processing apparatus including a filter circuit which performs median filter processing to obtain a median of multi-gradation image data with regard to a predetermined number of pixels including a target pixel and which uses the thus obtained median as multi-gradation image data for the target pixel, the image processing apparatus comprising an FIFO storage section which holds multi-gradation image data with regard to the predetermined number of pixels to be subjected to median filter processing by the filter circuit; a data write control section for writing into the FIFO storage section in a predetermined order the multi-gradation image data with regard to the target pixel to be subjected to median filter processing by the filter circuit; a counting section for counting the number of items of multi-gradation image data which are written into the FIFO storage section by the data write control section; and a filter circuit control section for controlling the operation of the filter circuit in response to a resultant count of the counting section, whereby when the counting section has counted up to the predetermined number, or when the counted value of the counting section is increased by a predetermined number after the counting section has counted up to the predetermined number, the filter circuit control section causes the filter circuit so as to perform median filter processing for the multi-gradation image data stored in the FIFO storage section.

By virtue of the image processing apparatus according to the first aspect of the present invention, it becomes unnecessary to read the multi-gradation image data corresponding to a predetermined number of pixels one by one and unnecessary to perform median filter processing for the thus read data for each target pixel. By reading only the multi-gradation image data corresponding to the number of added pixels, it is possible to continuously perform median filter processing for consecutive target pixels. As a result, it is possible to reduce the number of times the multi-gradation image data are read. Therefore, it becomes possible to provide a median filter while reducing the amount of data processing by software and ensuring the real-time operations, thereby resulting in a significant improvement in the positional accuracy of an image.

According to a second aspect of the present invention, there is provided an image processing apparatus including a filter circuit which performs median filter processing to obtain a median of multi-gradation image data with regard to a predetermined number of pixels including a target pixel and which uses the thus obtained median as multi-gradation image data of the target pixel. The filter circuit comprises a 1/0 counting section and a median determination section. The 1/0 counting section counts, in a descending order from the most significant bit to a lower order bit, the number of binary data "1" or "0" at the same bit position in the multi-gradation image data (binary data consisting of a plurality of bits) with regard to the predetermined number of pixels to be subjected to median filter processing by the filter circuit. The median determination section determines a median of the multi-gradation image data with regard to the predetermined number of pixels on the basis of a resultant count of the 1/0 counting section. On the basis of a count result of the 1/0 counting section at the most significant bit position, the median determination section determines multi-gradation image data which are not likely to become a median, and deletes the thus determined image data. Then, on the basis of a resultant count of the 1/0 counting section at the next lower bit position, the median determination section determines multi-gradation image data which are not likely to become a median from among a group of remaining multi-gradation image data, and deletes the thus determined image data. The median is determined through the repetition of the above determination and deleting operations.

By virtue of the image processing apparatus according to the second aspect of the present invention, it becomes possible to determine a median at extremely high speed without sorting multi-gradation image data while reducing the amount of data processing by software. As a result, it is possible to implement a median filter which can ensure real time operations. In this way, the positional accuracy of an image will be significantly improved.

According to a third aspect of the present invention, there is provided an image processing apparatus comprising a binary coding circuit which generates binary coded data by comparing with a preset threshold value multi-gradation image data obtained for each pixel, and a storage section which holds the binary coded data produced by the binary coding circuit. The image processing apparatus is further provided with a pattern code generating section for generating a pattern code representing the pattern of binary coded data of a plurality of adjacent pixels which have been produced by the binary coding circuit from data having multiple gradations with regard to the adjacent pixels, and an identification number generating section which generates one identification number with respect to the binary coded data of the plurality of pixels. The binary coded data of the pixels coded into binary digits by the binary coding circuit are stored into the storage section in the form of binary coded information consisting of the pattern code produced by the pattern code generating section and the identification number generated by the identification number generating section.

By virtue of this image processing apparatus according to the third aspect of the present invention, the binary coded information with regard to the adjacent pixels is collectively stored as a pattern code, and one identification number is assigned to the binary coded information of the pixels. Therefore, the memory capacity required for processing the binary coded image is significantly reduced.

BRIEF DESCRIPTION OF THE DRAWINGS

FIG. 5 is a diagram for explaining median filter processing (the order of writing multi-gradation image data) according to the present embodiment;

FIG. 6 is a flowchart for illustrating median filter processing (a median selecting method) according to the present embodiment;

FIG. 16 is a diagram showing the relationship between the binary image patterns and number of pixels according to the present embodiment; and FIG. 17 is a diagram showing the relationship between the binary image patterns and values to be added to variables of the center of gravity in the X and Y directions.

DESCRIPTION OF THE PREFERRED EMBODIMENTS (a) Aspects of the Present Invention In FIG. 1, an image processing apparatus 1A according to the first aspect of the present invention comprises a filter circuit 2, an FIFO storage section 3, a data write control section 4, a counting section 5, and a filter circuit control section 6.

Figure 1:
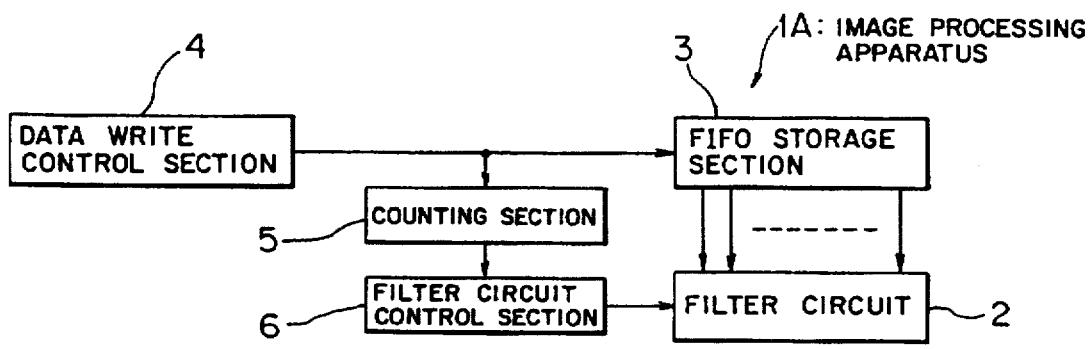
FIG. 1 is a block diagram showing a first aspect of the present invention.

The filter circuit 2 carries out median filter processing. The median filter processing is intended to obtain a median of multi-gradation image data with regard to a predetermined number of pixels including a target pixel, and which uses the thus obtained median as multi-gradation image data for the target pixel.

The FIFO storage section 3 holds the multi-gradation image data with regard to the predetermined number of pixels to be subjected to median filter processing by the filter circuit 2. The data write control section 4 writes multi-gradation image data with regard to pixels to be subjected to median filter processing by the filter circuit 2 into the FIFO storage section 3 in a predetermined order.

The counting section 5 counts the number of multi-gradation image data which are written into the FIFO storage section 3 by the data write control section 4. The filter circuit control section 6 controls the operation of the filter circuit 2 corresponding to a resultant count of the counting section 5.

In the image processing apparatus 1A of the first aspect of the present invention, when the counting section 5 has counted up to a predetermined number, or when the value of the counting section 5 is increased by a preset additional number after the counting section 5 has counted up to the predetermined number, the filter circuit control section 6 activates the filter circuit 2 so as to perform median filter processing for the multi-gradation image data stored in the FIFO storage section 3.

In the image processing apparatus 1A according to the first aspect of the invention which was described with reference to FIG. 1, when the counting section 5 has counted up to a predetermined number of pixels which are to be subjected to median filter processing, namely, when multi-gradation image data corresponding to a predetermined number of pixels are initially written into the FIFO storage section 3 in the predetermined order by the data write control section 4, the filter circuit control section 6 activates the filter circuit 2 so as to execute the first-time median filter processing of the multi-gradation image data stored in the FIFO storage section 3.

When the value obtained by the counting section 5 is increased by the preset additional number, namely, every time the multi-gradation image data corresponding to the number of added pixels are written into the FIFO storage section 3 by the data write control section 4 in a predetermined order, the filter circuit control section 6 activates the filter circuit 2 so as to perform median filter processing for the multi-gradation image data stored in the FIFO storage section 3.

As a result, it becomes unnecessary to read the multi-gradation image data corresponding to the predetermined number of pixels one by one and to perform median filter processing for the thus read data using the filter circuit 2. Simply writing the multi-gradation image data corresponding to the number of added pixels into the FIFO storage section 3 enables continuous execution of median filter processing of consecutive target pixels. This makes it possible to reduce the number of times the multi-gradation image data are read.

In this way, by virtue of the image processing apparatus 1A of the first aspect of the present invention which is shown in FIG. 1, it becomes unnecessary to read the multi-gradation image data corresponding to the predetermined number of pixels one by one and to carry out median filter processing of the thus read data for each target pixel. Simply reading the multi-gradation image data corresponding to the number of added pixels enables the continuous median filter processing of the consecutive target pixels. As a result, the number of times the multi-gradation image data are read can be reduced. It becomes possible to implement a median filter with a reduced the amount of data processing by software, and real-time operations are ensured, so that the positional accuracy of an image can be significantly improved.

Figure 2:
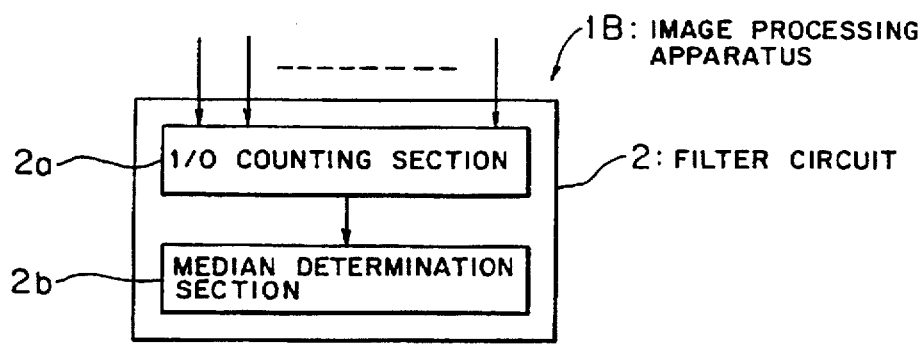
FIG. 2 is a block diagram showing a second aspect of the present invention.

FIG. 2 is a block diagram showing a second aspect of the present invention. In FIG. 2, an image processing apparatus 1B according to the second aspect of the present invention comprises the filter circuit 2 having the same function as the filter circuit shown in FIG. 1. In the image processing apparatus 1B according to the second aspect of the present invention, the filter circuit 2 comprises a 1/0 counting section 2a and a median determination section 2b.

The 1/0 counting section 2a counts the number of binary coded data 1 or 0 at the same bit position in multi-gradation image data (binary coded data consisting of a plurality of bits) with regard to a predetermined number of pixels to be subjected to median filter processing by the filter circuit 2 in a descending order from the most significant bit to a lower order bit.

The median determination section 2b determines a median of the multi-gradation image data with regard to the predetermined number of pixels on the basis of a resultant count of the 1/0 counting section 2a. The median determination section 2b determines multi-gradation image data, which are not likely to become a median, on the basis of the value of the 1/0 counting section 2a in the most significant bit position, and deletes the thus determined data. On the basis of a resultant count of the 1/0 counting section 2a at the next lower bit, the median determination section 2b determines multi-gradation image data which are not likely to become a median from among the group of remaining multi-gradation image data, and deletes the thus determined data. The median is determined through the repetition of these judgement and deleting operations.

In the image processing apparatus 1B according to the second aspect of the present invention which was described with reference to FIG. 2, the median determination section 2b determines a median of the multi-gradation image data corresponding to the predetermined number of pixels on the basis of the value of the 1/0 counting section 2a in the manner as previously mentioned. Hence, it becomes unnecessary to sort the multi-gradation image data as has been conventionally practiced, which in turn makes it possible to determine a median at high speed while reducing the amount of data processing by software.

In this way, by virtue of the image processing apparatus according to the second aspect of the present invention, it becomes possible to determine a median at extremely high speed without sorting multi-gradation image data while reducing the amount of data processing by software. As a result, it is possible to implement a median filter which can ensure real-time operations. In this way, the positional accuracy of an image can be significantly improved.

Figure 3:
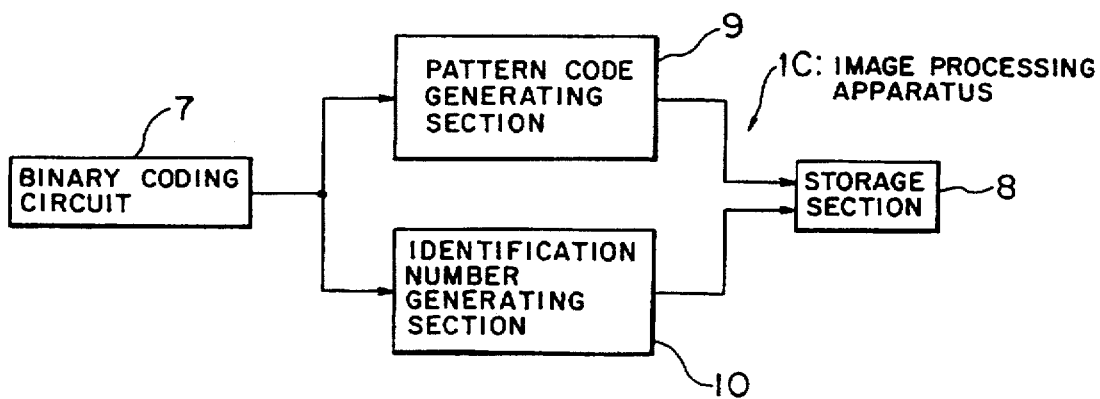
FIG. 3 is a block diagram showing a third aspect of the present invention.

FIG. 3 is a block diagram showing a third aspect of the present invention. In FIG. 3, an image processing apparatus 1C according to the third embodiment of the present invention comprises a binary coding circuit 7, storage section 8, a pattern code generating section 9, and an identification number generating section 10.

The binary coding circuit 7 generates binary coded data by comparing multi-gradation image data obtained for each pixel with a preset threshold value. The storage section 8 holds binary coded information generated by the binary coding circuit 7.

The pattern code generating section 9 generates a pattern code representing a pattern of the binary coded data which are produced by the binary coding circuit 7 from multi-gradation image data of the adjacent pixels. The identification number generating section 10 generates one identification number for the binary coded data of the plurality of pixels.

In the image processing apparatus 1C according to the third aspect of the present invention, the binary-coded data of the pixels produced by the binary coding circuit 7 are stored in the storage section 8 in the form of binary coded information which consists of the pattern code generated by the pattern code generating section 9 and the identification number generated by the identification number generating section 10.

In the image processing apparatus 1C according to the third aspect of the present invention which was described with reference to FIG. 3, the binary coded data produced by the binary coding circuit 7 are handled as a unit. One pattern code and one identification number are generated for the binary coded data that correspond to one unit. These pattern code and identification number are stored in the storage section 8 as the binary coded information. In other words, as a result of storing the binary coded information of the adjacent pixels as the pattern code in a grouped manner and of assigning one identification number to the grouped binary coded information, it is possible to significantly reduce the memory capacity (the capacity of the storage section 8) required for processing the binary coded image, compared with the memory capacity required in the prior art which assigns an identification number to each pixel.

The image processing apparatus 1C according to the third aspect of the present invention is provided with a measurement processing section which carries out measurement processing on the basis of the binary coded information stored in the storage section 8. This measurement processing section may be arranged so as to read the binary coded data of the pixels from the storage section 8 in the form of the binary coded information which consists of the pattern code and the identification number. The image corresponding to the binary coded data of the pixels is measured on the basis of the pattern code read from the storage section 8. In this case, it is possible to significantly reduce the number of times the binary coded information is read from the storage section 8 for measuring purposes, compared with the number of times binary coded information is read for each pixel in the prior art. Accordingly, it is possible to measure the image while considerably reducing the number of times the binary coded information is read, compared with the number of times the information is read in the prior art.

The image processing apparatus may also be arranged in such a way as to carry out measurement processing with low accuracy and measurement processing with high accuracy, in a switchable manner. In the measurement processing with low accuracy, the binary coded data of the plurality of pixels are handled as one pixel unit. On the other hand, in the measurement processing with high accuracy, an image is measured after the binary coded data of the pixels have been completely reconstituted on the basis of the pattern code. In this case, as a result of the selection of the measurement processing with low accuracy depending on the characteristics of an object to be measured, the image can be measured at higher speed albeit in a rough way. On the other hand, as a result of the selection of the measurement processing with high accuracy, as required, the image can be accurately measured on the basis of binary coded data of each pixel. Specifically, the measurement processing with low accuracy and the measurement processing with high accuracy are executed in a switchable manner, which in turn makes it possible to ensure the degree of accuracy at a single pixel level if an object need to be accurately measured, as well as to considerably speed up the measurement of the image.

By virtue of the image processing apparatus 1A to 1C according to the present invention, the amount of data processing by software associated with the median filter processing and binary coding of the multi-gradation image data and the measurement of the image is reduced, which in turn makes it possible to reduce the image memory capacity required when the image data are coded into binary digits. Even in the system having a limited amount of hardware and CPU performance, it is possible to speed up the processing of positional control based on the result of the measurement of the image and to ensure real-time operations.

(b) Embodiment of the Invention

With reference to the accompanying drawings, an image processing apparatus according to one embodiment of the present invention will now be described.

Figure 4:
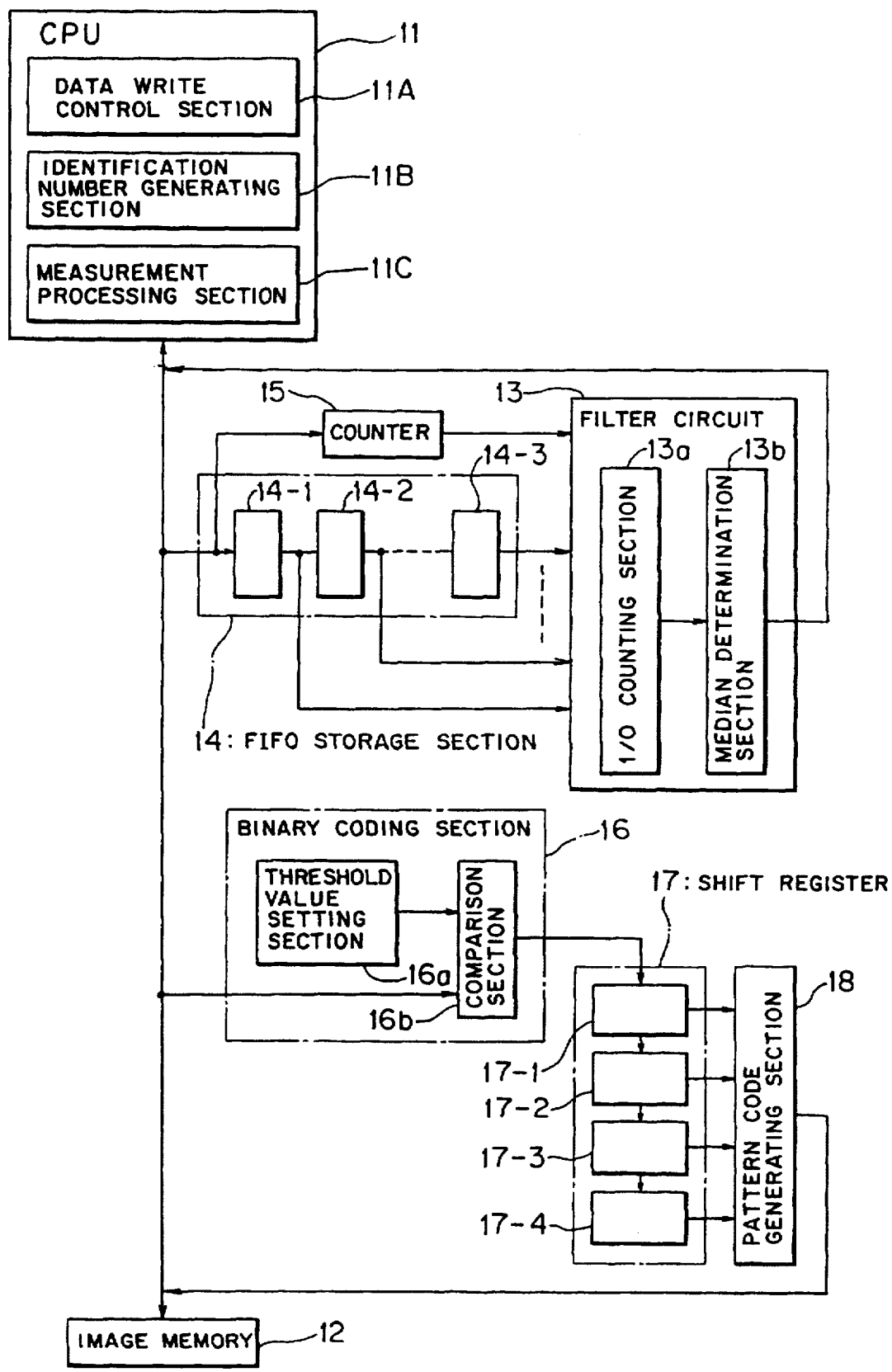
FIG. 4 is a block diagram showing a structure of an image processing apparatus according to one embodiment of the present invention.

FIG. 4 is a block diagram showing the structure of an image processing apparatus according to one embodiment of the present invention. The image processing apparatus of this embodiment shown in FIG. 4 comprises a CPU 11, image memory 12, a filter circuit 13, an FIFO storage section 14, a counter 15, a binary coding circuit 16, a shift register 17, and a pattern code generating section 18.

The CPU 11 supervises and controls the overall image processing apparatus of this embodiment. The CPU 11 also acts as a data write control section 11A, an identification number generating section 11B, and a measurement processing section 11C, which will be described later.

The image memory (storage section) 12 holds multi-gradation image data photographed by a camera or the like, multi-gradation image data subjected to median filter processing by the filter circuit 13, and image data (binary coded data) coded into binary digits by the binary coding circuit 16. The reading and writing of these data items are controlled by the CPU 11.

The filter circuit 13 carries out median filter processing which obtains a median of multi-gradation image data with regard to a predetermined number of pixels including a target pixel, and uses the thus obtained median as multi-gradation image data of the target pixel. The filter circuit 13 comprises a 1/0 counting section 13a and a median determination section 13b which will be described later.

The FIFO storage section 14 holds the multi-gradation image data with regard to the predetermined number of pixels (3 by 3 pixels in this embodiment) which are to be subjected to median filter processing by the filter circuit 13. The FIFO storage section 14 comprises nine stages of registers 14-1 to 14-9. As a result of the functioning of the CPU 11 as the data write control section 11A, multi-gradation image data with regard to pixels to be subjected to median filter processing by the filter circuit 13 are read from the image memory 12 in a predetermined order (FIG. 5), and the thus read data are written into the respective registers 14-1 to 14-9 of the FIFO storage section 14.

The counter 15 counts the number of items of multi-gradation image data which are read from the image memory 12 and are written into the FIFO storage section 14 under control of the CPU 11 (the data write control section 11A). This counter 15 also acts as a filter circuit control section which controls the operation of the filter circuit 13 corresponding to a resultant count of the counter 15. In other words, when the counter 15 has counted up to a predetermined number 9, or when the value of the counter 15 is increased by a preset number 3 after the counter 15 has counted up to the predetermined number 9, the counter 15 issues an instruction to activate the filter circuit 13. As a consequence, the multi-gradation image data stored in the FIFO storage section 14 are subjected to median filter processing.

The filter circuit 13 of this embodiment which is activated by the counter 15 comprises the 1/0 counting section 13a and the median determination section 13b.

In this embodiment, the multi-gradation image data are made of, for example, 8-bit binary coded data. The 1/0 counting section 13a counts the number of binary coded data 1 or 0 in the same bit position of the 8-bit data stored in each of the registers 14-1 to 14-9 of the FIFO storage section 14 in a descending order, from the most significant bit to a lower order bit.

The median determination section 13b determines a median of the nine items of multi-gradation image data stored in the FIFO storage section 14 on the basis of a count result of the 1/0 counting section 13a. Based on a resultant count of the 1/0 counting section 13a at the most significant bit position, the multi-gradation image data which are not likely to become a median are determined and deleted. On the basis of a resultant count of the 1/0 counting section 13a at the next lower bit, multi-gradation image data which are not likely to become a median are determined from among a group of the remaining multi-gradation image data, and the thus determined data are deleted. A median of the nine items of the multi-gradation image data stored in the FIFO storage section 14 is determined through the repetition of the above mentioned determination and deleting operations. The specific operation of the filter circuit 13 will be described later with reference to FIGS. 6 through 8.

The binary coding circuit 16 produces binary coded data for each pixel by comparing multi-gradation image data obtained as a result of median filter processing by the filter circuit 13 with a preset threshold value. The binary coding circuit 16 comprises a threshold value setting section 16a and a comparison section 16b. The threshold value 16a previously sets a predetermined threshold value. The comparison section 16b compares the threshold value set by the threshold value setting section 16a with the multi-gradation image data obtained as a result of filtering the data which the CPU 11 has read from the image memory 12. For example, if the multi-gradation image data are larger than the threshold value, "1" is output as binary coded data. On the other hand, if the multi-gradation image data are equal to or smaller than the threshold value, "0" is output as binary coded data.

Figures 9, 10, 11:
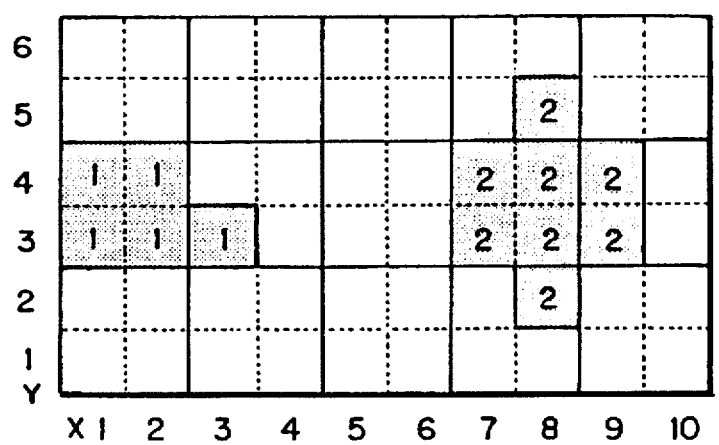
FIG. 9 is a diagram illustrating binary coding processing (the order of reading multi-gradation image data) according to the present embodiment.
FIG. 10 is a diagram showing binary image patterns of 2 by 2 pixels.
FIG. 11 is a diagram showing an example of binary coded image data to which identification numbers are assigned, taking 2 by 2 pixels as a processing unit.

The shift register 17 holds binary coded data (an output from the binary coding circuit 16) with regard to adjacent pixels (2 by 2 pixels such as shown in FIGS. 9 through 11 in this embodiment). This shift register 17 comprises four stages of registers 17-1 through 17-4.

The pattern code generating section 18 generates and outputs a pattern code corresponding to binary coded data stored in each of the registers 17-1 through 17-4 of the shift register 17. The pattern code output from the pattern code generating section 18 is stored in the image memory 12 in the form of binary coded data. In this embodiment, the pattern code of the 2 by 2 pixel-region is given one identification number which is generated as a result of the functioning of the CPU 11 as the identification number generating section 11B. These pattern code and identification number are stored in the image memory 12 as binary coded information corresponding to the 2×2 pixel-region.

As previously mentioned, the CPU 11 of this embodiment further acts as the measurement processing section 11C which measures the size (area), shape, position, and the center of gravity of a photographed image on the basis of the binary coded information stored in the image memory 12.

In this embodiment, when the measurement processing section 11C measures an image, the binary coded data (binary coded information consisting of a pattern code and an identification number) which take 2 by 2 pixels as a unit are read from the image memory 12. As will be described later, the image is measured on the basis of the pattern code. At this time, the measurement processing section 11C switchably executes low-accuracy measurement processing, which handle binary coded data of the 2 by 2 pixels as one pixel unit, and highly accurate measurement processing which measures the image after having completely reproduced the binary coded data of the 2 by 2 pixels on the basis of the pattern code.

With reference to FIGS. 5 through 16, the operation of the image processing apparatus of the present embodiment having the above mentioned construction will now be described.

(b1) Median Filter Processing of the Present Embodiment

Median filter processing of multi-gradation image data of 3 by 3 pixels will be initially described. The counter 15 is reset to start processing. A pixel (5) shown in FIG. 5 is taken as a target pixel, and multi-gradation image data with regard to pixels in a 3 by 3 pixel-area ((1) to (9)), with the target pixel (5) being located at the center of the area, are sequentially read from the image memory 12 in order to determine a value of the target pixel (5) (multi-gradation image data). The multi-gradation image data read from the image memory 12 by the function of the CPU 11 are stored in the registers 14-1 through 14-9 of the FIFO storage section 14, respectively.

The counter 15 counts the number of data items written into the FIFO storage section 14. The counter 15 activates the filter circuit 13 when it has counted up to 9. In other words, the multi-gradation image data of the pixels (1) to (9) are written into the FIFO storage section 14, and the filter circuit 13 is activated at the time when nine items of the image data have been written into the storage section.

After that, the filter circuit 13 is activated when the value of the counter 15 increases by three in the present embodiment. For example, as shown in FIG. 5, multi-gradation image data with regard to pixels (10) to (12) are written into the FIFO storage section 14 as a result of the functioning of the CPU 11 as the data write control section 11A. At this point in time, since multi-gradation image data with regard to the pixels (4)–(12) are stored in the FIFO storage section 14. Therefore, the pixels including the target pixel (8) are subjected to median filter processing as a result of the activation of the filter circuit 13. Similarly, the multi-gradation image data with regard to pixels (13) through (15) are written into the FIFO storage section 14, and the filter circuit 13 is activated. As a result, the pixels, including the target pixel (11), are subjected to median filter processing.

In this way, three items of the multi-gradation image data are read from the image memory 12, and the thus read data items are written into the FIFO storage section 14. As a result, it becomes possible to obtain a median of the multi-gradation image data corresponding to the nine pixels around the target pixel as a median of the target pixel. It becomes possible to permit the multi-gradation image data for each pixel to pass through the median filter by continuous execution of this processing.

The processing of the filter circuit 13 of this embodiment will now be described in detail. With regard to the processing, the conventionally employed technique involves determining the center of data after having sorted them. However, a median is selected without sorting the data in the present embodiment.

If the filter circuit 13 is activated when all of the nine items of multi-gradation image data are written into the FIFO storage section 14, it starts to compare the nine items of the multi-gradation image data stored in the registers 14-1 to 14-9 with each other in descending order from the most significant bit to a lower order bit according to a flowchart (steps S1 to S9) shown in FIG. 6. As a result, a median of the nine items of the data is extracted. As previously mentioned, each item of the multi-gradation image data comprises 8 bits, that is, D0 to D7.

As shown in FIG. 6, the most significant bit D7 is set to a bit to be compared (step S1). The 1/0 counting section 13a counts the number of 1's or 0's at the position of that bit D7 (step S2). In steps S3, it is determined whether or not the sum of the number of items of multi-gradation image data which are smaller than the median and are outside the group of candidates for the median (the number of smaller-side non-candidate data items) and the number of 0's is equal to or more than 5. When the processing of the most significant bit D7 is first started, the number of smaller-side non-candidate data items is 0. Hence, it is determined whether or not the number of 0's in nine items of the binary coded data at the most significant bit D7 is equal to or more than 5.

If the number is judged as being less than 5 in step S3 (if it is judged to be NO in step S3), the multi-gradation image data having 0 at its bit position are judged as having no possibility of becoming a median and are removed from the group of candidates for the median (step S4). If the number is judged as being equal to or more than 5 (if it is judged to be YES in step S3), the multi-gradation image data having 1 at its bit position are judged as having no possibility of becoming a median and are removed from the group of candidates for the median (step S5).

It is then determined whether or not the number of items of the remaining multi-gradation image data (the number of candidates) is 1 (step S6). If the number is 1 (if it is judged to be YES), the solely remaining multi-gradation image data is determined as a median by the median determination section 13b (step S9). If the number of items of the remaining multi-gradation image data (the number of candidates) is not 1 (if it is judged to be NO in step S6), it is then judged whether or not the bit being currently subjected to judgement is the least significant bit D0 (step S7). In this step S7, if the bit being currently subjected to judgement is judged as the least significant bit D0 (if it is judged to be YES), there still remain a plurality of multi-gradation image data which have the same value. In such a case, the median determination section 13b determines that the multi-gradation image data having the same value are the median (step S9).

If the bit currently subjected to judgement is determined not to be the least significant bit D0 in step S7 (if it is judged to be NO), the next lower bit is then judged (step S8). The processing returns to step S2, and similar processing is then repeatedly carried out.

Figures 7, 8:
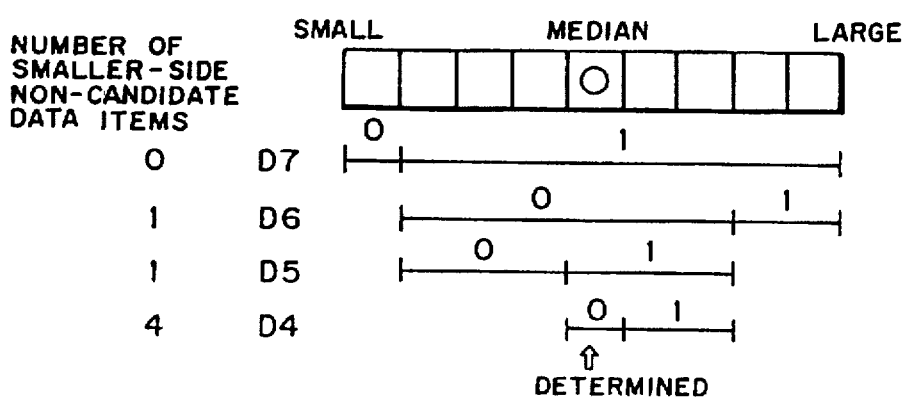
FIG. 7 is a diagram for explaining median filter processing (a median selecting method) according to the present embodiment.
FIG. 8 is a diagram for illustrating binary coding processing (the order of reading multi-gradation image data) according to the present embodiment.

FIG. 7 shows a more specific example. In the example shown in FIG. 7, nine items of data (1)–(9) are subjected to median filter processing. In other words, in the present embodiment, the data items are judged one by one from the most significant bit D7 according to the procedure shown in FIG. 6 in order to select the fifth largest data item from among the nine items of data (1)–(9). The data items are deleted from the table in such a way that the fifth data item remains as the multi-gradation image data with regard to the target pixel (5).

Where the multi-gradation image data 1 through 9, as shown in FIG. 7, are obtained and stored in the FIFO storage section 14, five 1's are present in the most significant bit D7. Therefore, the data items 3, 5, 7, and 8 which have 0 in their most significant bits D7 are removed from the table. This processing is carried out with respect to lower order bits D6, D5 ... until the fifth largest data item is obtained. The thus calculated median is delivered to the CPU 11 and is stored in the image memory 12 as the multi-gradation image data of the target pixel (5).

The example shown in FIG. 7 shows the case where the data item 9 is selected as a median as a result of judgement of the bit D6.

The technique of selecting a median according to the present embodiment will be explained in a more easily understandable way with reference to FIG. 8. In FIG. 8, nine items of multi-gradation image data are arranged in ascending order of size, from left to right. Data items of bits D7, D6, D5, and D4 are arranged in descending order from the top.

In the example shown in FIG. 8, there are one 0 and eight 1's in the most significant bit D7. The multi-gradation image data having 0 at the most significant bit D7 are eliminated as not likely to become a median. There are six 0's and two 1's at the bit D6. The number of the smaller-side non-candidate data items is one. As a result of the judgement in step S3 shown in FIG. 6 [1+6≧5], the multi-gradation image data that have 1 are eliminated as not likely to become a median.

Similarly, there are three 0's and three 1's in bit D5. The number of the smaller-side non-candidate data items is one. As a result of the judgement in step S3 shown in FIG. 6 [1+3<5], the multi-gradation image data that have 0 are eliminated as not likely to become a median. There are one 0 and two 1's in bit D4. The number of the smaller-side non-candidate data items is four at the present time. As a result of the judgement in step S3 shown in FIG. 6 [4+1≧5], the multi-gradation image data which have 1 are eliminated as not likely to become a median. In the example shown in FIG. 8, the number of remaining multi-gradation image data is one when the judgement of the bit D4 has been completed. The remaining multi-gradation image data are determined as the median.

The multi-gradation image data with regard to the pixels (4) to (12) are necessary to determine the value of the pixel (8) (multi-gradation image data). In the present embodiment, the data with regard to the pixels (1) through (9) are stored in the registers 14-1 to 14-9 of the FIFO storage section 14. Accordingly, the data write control section 11A (software) of the CPU 11 reads the multi-gradation image data with regard to the pixels (10) to (12) from the image memory 12 and writes the thus read data into the FIFO storage section 14. The data items of the pixels (1) to (3) are shifted outside one by one, as a result of which the multi-gradation image data with regard to the pixels (4) to (12) are stored in the registers 14-1 to 14-9 of the FIFO storage section 14.

In the present embodiment, upon detection of an increase in the count by three, the counter 15 judges that the multi-gradation image data with regard to the pixels (10) to (12) have been written into the FIFO storage section 14, and it activates the filter circuit 13. As a result, the nine items of multi-gradation image data stored in the FIFO storage section 14 are subjected to median filter processing in a similar way to that which as has been previously described with reference to FIGS. 6 through 8. As a result of the repetition of the processing, it becomes possible to continuously median filter the consecutive target pixels.

In this way, in the present embodiment, the filter circuit 13 counts the number of 1's and 0's in descending order from an upper order bit, so as to eliminate the data which are not likely to become a median from the group of candidates for the median. The data items are eliminated from the table while the number of non-candidate data items is counted starting from data representing the largest value or from data representing the smallest value, so that a median is left, whereby the median is determined.

It is only necessary for the software to read the multi-gradation image data with regard to pixels around the target pixel, whereby a median can be obtained. For example, if the software sorts 3 by 3 pixels in order to calculate the fifth value, a simple sorting operation requires 36 comparing operations (8+7+6+. . . +1). However, in the case of the hardware of the present embodiment, it becomes possible for the filter circuit 13 to determine a median by solely reading multi-gradation image data with regard to nine pixels from the image memory 12 and the data from the FIFO storage section 14. All that is needed is to read the multi-gradation image data with regard to three pixels adjacent to a target pixel from the image memory 12 when a median of the adjacent pixels is obtained.

As previously mentioned, as a result of the execution of median filter processing, the image processing apparatus of the present embodiment can reduce the number of times the multi-gradation image data are read. Further, it is unnecessary for the image processing apparatus to sort the multi-gradation image data, which makes it possible to determine a median at considerably high speed while reducing the amount of data processing by software. As a result, it is possible to effect median filter processing while real-time operations are ensured, which in turn makes it possible to realize significantly improved positional accuracy of an image.

(b2) Binary Coding of the Present Embodiment

The multi-gradation image data that were subjected to median filter processing in the manner as has been previously mentioned are temporarily stored in the image memory 12. Thereafter, they are read from the image memory 12, and the thus read data are then coded into binary digits by the binary coding circuit 16. In other words, in the present embodiment, the multi-gradation image data with regard to each of pixels are read from the image memory 12 in order, for example, in ascending order (1), (2), . . . as shown in FIG. 9. Then, in the embodiment, the thus read multi-gradation image data are input to the binary coding circuit 16.

The binary coding circuit 16 compares input multi-gradation image data with a threshold value set by the threshold value setting section 16a. If the multi-gradation image data are larger than the threshold value, "1" is output as binary coded data. If the multi-gradation image data are equal to or smaller than the threshold value, "0" is output.

The binary coded data output from the binary coding circuit 16 are sequentially stored in the shift register 17. When binary coded data with regard to four pixels (1) to (4) are stored in four registers 17-1 to 17-4 of the shift register 17, it becomes possible to obtain patterns in the form of 1 or 0 (there are sixteen patterns, as shown in FIG. 10 in the case of a 2 by 2 pixel-region) from the registers 17-1 to 17-4. Pattern codes corresponding to the patterns are generated by the pattern code generating section 18, and the thus generated pattern codes are then stored as binary coded information in the image memory 12.

As shown in FIG. 11, one identification number is assigned to continuous ON-state pixels (pixels of "1" level) in the binary coded image in order to measure an image. At this time, in the present embodiment, one identification number, which is generated as a result of the operation of the CPU 11 functioning as the identification number generating section 11B, is assigned to the pattern code of the 2 by 2 pixel-region. The pattern code and the identification number are stored as the binary coded information corresponding to the 2 by 2 pixel-region in the image memory 12.

Figure 12:
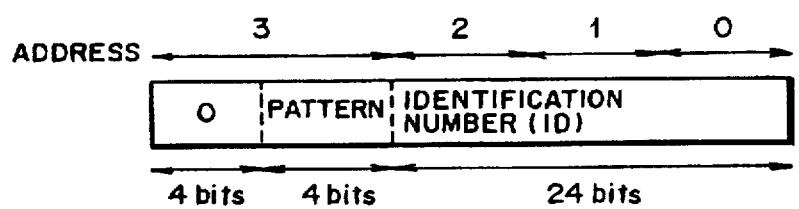
FIG. 12 is a diagram showing a format of binary coded data according to the present embodiment.

One example of the format of the binary coded information stored in the image memory 12 is shown in FIG. 12. On the assumption that 2 by 2 pixels are taken as one unit, and that a memory area for one byte (8 bits) is prepared for one pixel, lower order 4 bits of the most significant address comprising four bytes are used for a pattern code. The remaining three bytes (twenty four bits) are used for an identification number. In this case, $2^{12} \times 2^{12}$ different identification numbers are available. However, so many different identification numbers are not actually necessary, and hence the capacity of the image memory 12 can be reduced.

In the case of the conventional technique which assigns one identification number to one pixel, memory capacity corresponding to at least [the number of bits of an identification number]×[the number of pixels] was necessary. On the contrary, in the case of the technique which assigns an identification number to "n" pixels grouped into one unit, memory capacity corresponding to [(the number of bits of an identification number)+n]×[(the number of pixels)/n] is sufficient. The present embodiment relates to the case where n=2×2=4. For example, given that there are 1000 pixels, and that the number of bits of an identification number is eight, the conventional technique requires memory capacity corresponding to at least 8000 bits. However, in the case of the present embodiment, memory capacity corresponding to [8+4]×[1000/4]=3000 bits is sufficient. Thus, the memory capacity can be significantly reduced. In this way, even though the memory capacity is reduced, all the binary coded data within the 2 by 2 pixel-region still remain as a result of the pattern codes.

In the manner as previously mentioned, the pattern code and the identification number are provided to the binary coded data corresponding to the 2 by 2 pixels. The pattern code and the identification number are stored in the image memory 12 in the form of binary coded information. Thereafter, multi-gradation image data with regard to the next four pixels [pixels (5)–(8); (9)–(12); ... shown in FIG. 9] are coded one after another into binary digits by the binary coding circuit 16. The thus binary coded data are input to the shift register 17 and are sequentially stored into registers 17-1 to 17-4. When the binary coded data with regard to the next four pixels are read into the shift register 17, the pattern code and the identification number are provided to the binary coded data in the same manner as previously mentioned.

If a memory area which receives image data from a camera, or the like, and a memory area which holds image data for use in measuring an image are the same, the following processing becomes feasible. If the image data received from the camera have a 16-step gradation (four bits), memory capacity of 4 bits per pixel is sufficient for the image memory 12 which expands the image data. However, assignable identification numbers are limited up to 15. In fact, it is necessary to prepare at least eight bits per pixel. To cope with such a case, if the pattern code and the identification number are assigned to four pixels grouped into one unit as in the present embodiment, it is possible to ensure memory area corresponding to 16 bits by combining the four pixels together even if there is memory area corresponding to only four bits per pixel. For this reason, of 16 bits constituting the memory area, four bits can be used for pattern codes, and the remaining 12 bits can be used for identification numbers. This enables the execution of practical processing, and the image memory 12 can be designed to have the minimum construction in agreement with the 16-step gradation.

(b3) Measurement of an Image in the Present Embodiment

In the present embodiment, the CPU 11 (the measurement processing section 11C) reads the binary coded information (the pattern code and the identification number) comprising data items, grouped into one unit, with regard to a plurality of pixels (four pixels) from the image memory 12. Upon reference to a table including preset numerical values corresponding to the pattern codes, the number of pixels within a pixel area having the same identification number (that is, the size (area) of an object to be measured), the shape of the object, its position, and the center of gravity of the object are measured.

During the measurement of an image, the area, center of gravity, and position of the object are measured using the number and shape of pixels having the same identification numbers. The measurement of an image will be described with reference to the case where the number of pixels having the same identification number is counted when the identification number is assigned to the pixels in the form as shown in FIG. 11.

Conventionally, when the number of pixels having the same identification number is counted on the basis of the data items which are assigned an identification number for each pixel, binary coded data for 60 pixels are sequentially read. If the binary coded data item has an identification number, the counter is incremented by one for each identification number.

On the other hand, in the present embodiment, an image is divided into 2 by 2 pixel segments by a solid line as shown in FIG. 11, and the 2 by 2 pixels are taken as a unit. A pattern code and an identification number are assigned to the pixel data, whereby the pixal data are stored as binary coded information. If the binary coded information has the identification number when being read, the number of pixels, which is any one of 1, 2, 3, and 4 and corresponds to the pattern code, is added to the count. As a result, the number (area) of pixels for each identification number can be measured. Hence, the number of times the image data are read from the image memory 12 is reduced to a quarter. The relationship between the pattern code and the number of pixels is previously set in the table (FIG. 16).

Moreover, where the position of the image is measured, it is judged whether or not the target area requires high accuracy, using information in units of four pixels, because detailed information is not necessarily required for all of the identification numbers. Switching between measurement processing with high accuracy and measurement processing with low accuracy makes it possible to speed up the measurement of the image. In other words, rough calculation is first performed using the information in units of four pixels. Then, if the area requires detailed information, the position of the image is read from the pattern code with resolutions up to a single pixel. By means of the technique of storing binary coded data according to the present embodiment, information at single pixel level is left. Hence, it is possible to use data depending on the accuracy which the object to be measured requires.

Figure 13:
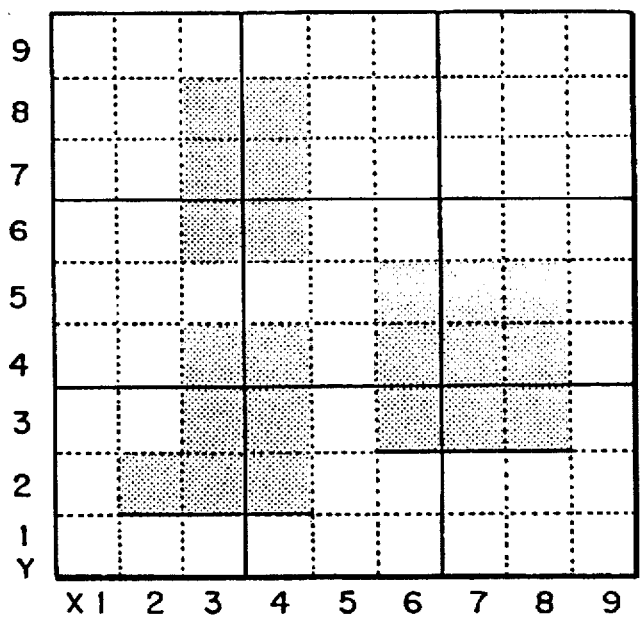
FIG. 13 is a diagram showing an example of binary coded image data in the case where 3 by 3 pixels are taken as a processing unit.

In the above processing, the binary coding processing and the measurement of an image are carried out using 2 by 2 pixels as a unit. For example, as shown in FIG. 13, if an image is measured using 9 pixels, that is, a 3 by 3 pixel-region, as one unit, a split pattern arises wherein ON-state (binary coded data is 1) areas are split into a plurality of areas. In such a case, so long as the measurement processing does not need high accuracy, it is judged whether the unit area comprising nine pixels is in an ON or OFF state from a ratio of the number of ON-state pixels to OFF-state pixels in the area. One identification number is provided to that area, which in turn allows high speed processing. On the other hand, if the measurement processing needs high accuracy, the accuracy at a single pixel level can be ensured by reading the pattern code of the area to be measured and referring to the pattern codes of adjacent areas.

With reference to FIGS. 14 through 17, more detailed explanations will be given of the measurement of an image using 2 by 2 pixels as one unit (the measurement of area and center of gravity of an image).

Figures 14, 15:
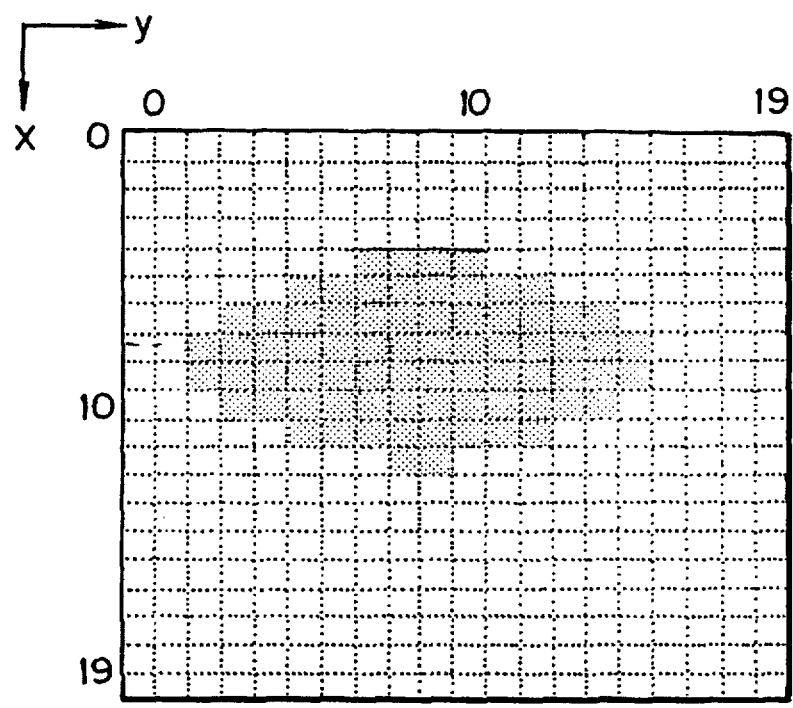
FIG. 14 is a diagram showing an example of binary coded image data.
FIG. 15 is a diagram for explaining binary coding processing (the order of reading multi-gradation image data) according to the present embodiment.

For example, given that a crosshatched area (pixels) within image data comprising 20 by 20 pixels is in an ON state (a result of binary coding is 1) as shown in FIG. 14, the technique of measuring the area and center of gravity of an image will be described with reference to specific programs.

(b3-1) Area Measurement

In the measurement of an area, the number of pixels having the same identification number within the area comprising 20 by 20 pixels shown in FIG. 14 is counted.

Each pixel is provided with an identification number according to the conventional technique. Therefore, when the area of the image is simply measured, judgement and increment operations are executed a number of times corresponding to the number of pixels (that is, 400 times) as shown in the following program. In the following program descriptions, descriptions between /* and */ are comments explaining the contents of the program on that line.

```
" extern unsigned char image [ ] [20] ;/* image memory of
20 by 20 pixels */
    pixels=0;    /* count value of the number of pixels */
    for(y=0;y<20;y++)
        for(x=0;x<20;20;x++)
            if(image(y)(x)==id)    /* the ID of the pixel
agrees with the target ID (id) ? */
                pixels++ ;    /* Counter is incremented
by one if they agree */ "
```

The case where 2 by 2 pixels are used as a unit, as it is used in the present embodiment, will now be described. Multi-gradation image data for each pixel are binary coded in such an ascending order as shown in FIG. 15, for example, 0, 1, 2, . . . , 40, 41, 42, . . . As a result, binary coded information having such a format as shown in FIG. 12 are obtained. The relationship between pattern codes of (16 patterns) regions comprising 2 by 2 pixels and the number of pixels in each 2 by 2 pixel region is previously stored in the form of a table within the program. In such a case, the area of the image is measured according to the following program.

```
" static int table( )= {0,1,1,2,1,2,2,3,1,2,2,3,2,3,3,4};
    extern unsigned long image4( )(10)    ;/* a 10 by 10
pixel-region where four bytes are used as a unit*/
    extern unsigned char image1( )(10)(4);
                /* Facilitate access to the pixel
data by changing the unit of four bytes to a unit of one
byte */
    pixels=0;
    for(y=0;y<10;y++)
        if((image4(y)(x)&0x00ffffff)==id))
                /* the ID of the pixel agrees
with the target ID (id) ? */
            pixels+=table(imgl(y)(x)(3));    /* the number of
pixels corresponding to a pattern code is added to the
count value */ "
```

According to this program, the judgement, masking of bits, and addition are executed 100 times. Compared with the loop which is carried out 400 times according to the conventional technique, it can be seen that the number of processing steps is significantly reduced if the area of the image is measured using 2 by 2 pixels as one unit, as it is practiced in the present embodiment.

(b3-2) Measurement of Center of Gravity

The center of gravity of the image can be calculated by adding together the X and Y coordinates where pixels having the same identification number exist in the area comprising 20 by 20 pixels shown in FIG. 14, in each of the X and Y directions.

Each pixel is provided with an identification number according to the conventional technique. Therefore, when the center of gravity of the image is measured, judgement and increment operations are executed a number of times corresponding to the number of pixels (that is, 400 times) as shown in the following program.

```
" extern unsigned char image [ ] [20] ;/* image memory of
20 by 20 pixels */
    gx=0;    /* center of gravity in the X coordinate */
    gy=0;    /* center of gravity in the Y coordinate */
    for(Y=0;y<20;y++)
        for(x=0;x<20;x++)
            if(image(y)(x)==id)    /* the ID of the pixel
agrees with the target ID (id) ? */
                {
                gx+=x ;
                gy+=y ;
                } "
```

The case where 2 by 2 pixels are used as a unit, as it is used in the present embodiment, will now be described. Multi-gradation image data for each pixel are binary coded in such an ascending order as shown in FIG. 15, for example, 0, 1, 2, . . . , 40, 41, 42, . . . As a result, binary coded information having such a format as shown in FIG. 12 are obtained. The relationship between pattern codes (16 patterns) of regions comprising 2 by 2 pixels and values to be added to variables of the center of gravity in the x and y directions is previously prepared in the form of a table. In such a case, the center of gravity of the image is measured according to the following program.

```
" extern unsigned long image4( )(10)    ;/* a 10 × 10 pixel-
region where four bytes are used as a unit*/
    extern unsigned char image1( )(10)(4);
                /* Facilitate access to the pixel
data by changing the unit of four bytes to a unit of one
byte */
struct __TABLE
    {    unsigned char mx ;    /* the product of x */
        unsigned char ax ;    /* the sum of x */
        unsigned char my ;    /* the product of y */
        unsigned char ay ;    /* the sum of y */
    } ;
static struct __TABLE table( )= {
        {0,0,0,0}, {1,0,1,0}, {1,0,1,1}, {2,0,2,1},
        {1,1,1,0}, {2,1,2,0}, {2,1,2,1}, {3,1,3,1},
        {1,1,1,1}, {2,1,2,1}, {2,1,2,2}, {3,1,3,2},
        {2,2,2,1}, {3,2,3,1}, {3,2,3,2}, {4,2,4,2} } ;
    gx=0;
    gy=0;
    for(x=0;x<10;x++)
        for(y=0;y<10;y++)
            if((image4(y)(x)&0x00ffffff)==id))
                /* the ID of the pixel
agrees with the target ID (id) ? */
                {
                n=img1(y)(x)(3) ;
                gx+=table(n).mx*(2*x)+table(n).ax ;
                gy+=table(n).my*(2*y)+table(n).ay ;
                } ; "
```

As can be seen from the above program, the number of times the loop is executed is reduced from 400 times (as was the case in the conventional technique) to 100 times according to the program of the present embodiment.

In such a system which does not need very high resolution, it is possible to significantly speed up the determination of the center of gravity of the image by use of the following program using the same image data.

```
" extern unsigned long image4( )(10)    ;/* a 10 × 10 pixel-
region where four bytes are used as a unit*/
    extern unsigned char image1( )(10)(4);
                /* Facilitate access to the pixel
data by changing the unit of four bytes to a unit of one
byte */
    gx=0;
    gy=0;
    for(y=0;y<10;y++)
        for(x=0;x<10;x++)
            if((image4(y)(x)&0x00ffffff)==id))
                /* the ID of the pixel
```

-continued

```
agrees with the target ID (id) ? */
    {
        gx+=2*x ;
        gy+=2*y ;
    } ;"
```

The execution of the above program, taking a 2 by 2 pixel region as a unit, results in decreased resolution. However, since processing relating to the shape of the image is not carried out, it is possible to speed up the processing by about four times compared with the processing speed obtained by the conventional method of measuring the center of gravity of the image.

As previously mentioned, it is possible to measure the image data (binary coded data) with either low resolution (low degree of precision) and high resolution (high degree of precision). Further, it becomes possible to measure the center of gravity of an image by dynamically switching the resolution depending on the conditions of an object to be measured and the relative convenience of software.

The image measurement processing of the present embodiment allows the significant speeding up of the measurement processing by processing a plurality of pixels grouped into a unit. If four pixels are processed as one unit as in the previous embodiment, image data of the pixels are read from the image memory 12 so that they can be subjected to image processing. The pixels are stored in the image memory 12 in the form of binary coded information, grouping four pixels into one unit. Therefore, the number of times the data are read can be reduced to a quarter. Generally, when compared with making access to a program area, it takes much longer time to carry out the access to a memory area having large capacity like the image memory 12. For this reason, the reduction in the number of times the CPU makes access to the image memory 12 contributes to the speeding up of the overall processing speed in a considerably effective way.

High accuracy of an image is not necessarily required throughout all of the image processing steps. For example, if an area less than a certain size is deleted from an image to which an identification number has been given, high precision is not usually required. Therefore, in the present embodiment, the amount of data processing by software to be performed can be reduced to a quarter as has been already described in the explanations of the measurement of the center of gravity.

All of the image information at a single pixel level is held by means of the pattern codes. If high accuracy is required, all of the image information can be reproduced on the basis of the pattern codes. In the image processing apparatus of the present embodiment, the selection of the measurement processing with low accuracy and the measurement processing with high accuracy depending on circumstances makes it possible to ensure accuracy at a single pixel level if an object to be measured requires high accuracy, as well as to significantly speed up the image measurement processing.

In this way, according to one of the preferred embodiments of the present invention, the median filter processing and binary coding of multi-gradation image data and the amount of data processing by software resulting from the measurement of an image are reduced. Further, the capacity of the image memory 12 required when a binary coded image is processed can be considerably reduced. For these reason, even in the case of a system having a limited amount of hardware and CPU performance limited, it is possible to ensure real-time operations as well as to speed up the execution of position control based on a result of the measurement of the image.

Particularly, if a system which feed-back controls the position (attitude) of a robot by measuring its position through processing of an image photographed by a camera is operated in a special environment, for example, when it is used in an artificial satellite, reductions in weight and power consumption are strongly desired. The application of the image processing apparatus according to the present invention to such a system makes it possible to implement simplified software processing and a reduced amount of hardware. In this way, it is possible to apply the image processing apparatus of the present invention to a system having a built-in computer for use in a special environment, for example, for use in an artificial satellite.

The previously mentioned embodiments are directed to the case where the multi-gradation image data of 3 by 3 pixels are subjected to median filter processing. As a matter of course, the present invention is not limited to these embodiments. In the previous embodiments, the explanation was also given of the case where the multi-gradation image data are coded into binary digits, taking 2 by 2 pixels as one unit. The present invention is not solely limited to such an embodiment.

What is claimed is:

1. An image processing apparatus including a filter circuit which performs median filter processing to obtain a median of multi-gradation image data with regard to a predetermined number of pixels including a target pixel and which uses the thus obtained median as multi-gradation image data for the target pixel, the image processing apparatus comprising:

an FIFO storage section which holds multi-gradation image data with regard to the predetermined number of pixels to be subjected to median filter processing by said filter circuit;

a data write control section for writing into said FIFO storage section in a predetermined order the multi-gradation image data with regard to the target pixel to be subjected to median filter processing by said filter circuit;

a counting section for counting the number of items of multi-gradation image data which are written into said FIFO storage section by said data write control section; and a filter circuit control section for controlling the operation of said filter circuit in response to a resultant count of said counting section, whereby when said counting section has counted up to the predetermined number, or when the counted value of said counting section is increased by a predetermined number after said counting section has counted up to the predetermined number, said filter circuit control section causes said filter circuit so as to perform median filter processing for the multi-gradation image data stored in said FIFO storage section.

2. An image processing apparatus including a filter circuit which performs median filter processing to obtain a median of multi-gradation image data with regard to a predetermined number of pixels including a target pixel and which uses the thus obtained median as multi-gradation image data of the target pixel, said filter circuit comprising:

a 1/0 counting section which counts, in a descending order from the most significant bit to a lower order bit, the number of binary coded data "1" or "0" at the same bit position in the multi-gradation image data (binary coded data consisting of a plurality of bits) with regard to the predetermined number of pixels to be subjected to median filter processing by said filter circuit; and a median determination section which determines a median of the multi-gradation image data with regard to the predetermined number of pixels on the basis of a resultant count of said 1/0 counting section, wherein said median determination section determines multi-gradation image data which are not likely to become a median on the basis of a count result of said 1/0 counting section at the most significant bit obtained by said 1/0 counting section and deletes the thus determined image data, and said median determination section determines multi-gradation image data which are not likely to become a median from among a group of remaining multi-gradation image data on the basis of a resultant count of said 1/0 counting section at the next lower bit position and deletes the thus determined image data, whereby the median is determined through the repetition of the determination and deleting operations.

3. An image processing apparatus including a binary coding circuit which generates binary coded data by comparing multi-gradation image data obtained for each pixel with a preset threshold value, and a storage section which holds the binary coded data produced by the binary coding circuit, the image processing apparatus comprising:

a pattern code generating section for generating a pattern code representing the pattern of binary coded data of a plurality of adjacent pixels which has been produced by said binary coding circuit from data having multiple gradations with regard to the adjacent pixels; and an identification number generating section which generates one identification number with respect to the binary coded data of the plurality of pixels, whereby the binary coded data of the pixels coded into binary digits by said binary coding circuit are stored into said storage section in the form of binary coded information consisting of the pattern code produced by said pattern code generating section and the identification number generated by said identification number generating section.

4. The image processing apparatus according to claim 3, further comprising a measurement processing section for carrying out measurement processing on the basis of the binary coded information stored in said storage section, wherein said measurement processing section reads the binary coded data with regard to the plurality of pixels from said storage section in the form of the binary coded information made of the pattern code and the identification number, and carries out measurement processing of the binary coded data of the plurality of pixels on the basis of the pattern code read from said storage section.

5. The image processing apparatus according to claim 4, wherein said measurement processing section switches between measurement processing with low accuracy, in which measurement processing is carried out while handling the binary coded data of the plurality of pixels as one pixel unit, and measurement processing with high accuracy, in which the measurement processing is carried out after the binary coded data of the plurality of pixels have been fully reproduced on the basis of the pattern code.

* * * * *